United States Patent [19]
Gupta et al.

[11] Patent Number: 5,881,280
[45] Date of Patent: Mar. 9, 1999

[54] METHOD AND SYSTEM FOR SELECTING INSTRUCTIONS FOR RE-EXECUTION FOR IN-LINE EXCEPTION RECOVERY IN A SPECULATIVE EXECUTION PROCESSOR

[75] Inventors: Rajiv Gupta, Los Altos; Alan H. Karp, Palo Alto, both of Calif.

[73] Assignee: Hewlett-Packard Company, Palo Alto, Calif.

[21] Appl. No.: 900,274

[22] Filed: Jul. 25, 1997

[51] Int. Cl.$^6$ ...................................................... G06F 9/00
[52] U.S. Cl. ............................................................ 395/591
[58] Field of Search .............................................. 395/591

[56] References Cited

U.S. PATENT DOCUMENTS

| | | | |
|---|---|---|---|
| 5,627,981 | 5/1997 | Adler et al. ............................. | 395/591 |
| 5,634,023 | 5/1997 | Adler et al. ............................. | 395/591 |
| 5,692,169 | 11/1997 | Kathail et al. .......................... | 395/591 |
| 5,748,936 | 5/1998 | Karp et al. .............................. | 395/591 |

FOREIGN PATENT DOCUMENTS

| | | |
|---|---|---|
| 0372751 | 11/1989 | European Pat. Off. . |
| 0675434 | 3/1995 | European Pat. Off. . |
| 2284493 | 8/1994 | United Kingdom . |

OTHER PUBLICATIONS

"Some Design Ideas for a VLIW Architecture for Sequential–Natured Software", by K. Ebcioglu, Part 1: Parallel Architectures, *Parallel Processing*, Proceedings of the IFIP WG 10.3 Working conference on Parallel Processing, Pisa, Italy, 25–27 Apr. 1988, pp. 3–21.

IBM Research Report, "Some Global Compiler Optimizations and Architectural Features for Improving Performance of Superscalars", by K. Ebcioglu and R. Groves, pp. 1–13.

"Sentinel Scheduling for VLIW and Superscalar Processors", by S. A. mahlke, W.Y. Chen, W.W. Hwu, B. Ramakrishna Rau and M.S. Schlansker.

"Sentinel Scheduling: A Model for Compiler–Controlled Speculative Execution", by S.A. Mahlke, W.Y. Chen, R.A. Bringmann, R.E. Hank, W.W. Hwu, Systems, Nov. 1993, pp. 1–47.

*Primary Examiner*—Richard L. Ellis

[57] ABSTRACT

A method and related control logic for performing in line recovery from deferred exceptions generated by speculative operations. The control logic includes a re-execution register to mark operands of operations that should be re-executed in a special recovery mode. When the processor detects a deferred exception, it branches to the operation that generated the exception and enters the special in-line recovery mode. The processor executes operations non-speculatively in the recovery mode, and marks the result registers of these operations with re-execution flags. The processor then knows whether to re-execute an operation by checking for re-execution flags associated with the operands of an in-line operation. The processor exits recovery mode when it returns to the point where it detected the deferred exception. The re-execution register enables the processor to recover from deferred exceptions using the program code only, without any additional fix-up code or recovery code.

20 Claims, 4 Drawing Sheets

METHOD AND SYSTEM FOR SELECTING INSTRUCTIONS FOR RE-EXECUTION FOR IN-LINE EXCEPTION RECOVERY IN A SPECULATIVE EXECUTION PROCESSOR

TECHNICAL FIELD

The invention relates to speculative execution techniques in a processor, and more specifically relates to an approach for recovering from exceptions in a speculative execution processor.

BACKGROUND OF THE INVENTION

In the field of computer processor design, developers are always looking for ways to increase the rate at which the processor executes instructions. To accomplish this goal, the processor can be designed to execute several operations at once, or the cycle time of the processor can be reduced. One type of processor, referred to as a superscalar processor, includes special hardware to identify operations in the instruction stream that can be executed simultaneously. The superscalar processor improves performance by executing operations in the instruction stream simultaneously.

Another type of processor, referred to as superparallel or Very Long Instruction Word (VLIW), relies on the compiler to schedule operations in bundles that can be executed in parallel. Since the hardware is simpler than in superscalar processors, the cycle time can be reduced further.

One problem with processors that can execute more than one operation in parallel is that there often are not enough independent operations to keep the hardware resources busy. The phrase commonly used to refer to the extent to which operations can be executed in parallel is "Instruction Level Parallelism." Programs executed on VLIW processors are typically optimized to improve instruction level parallelism. This optimization can be performed in the compiler, in the hardware, by hand, or using some combination of these techniques.

Speculative code motion is a form of optimization that can improve instruction level parallelism. In general, it involves moving an operation across a conditional branch that controls its execution. In speculative code motion, one or more operations are moved from their home basic block to a previous basic block in the program. A "basic block" is a straight line sequence of operations followed by a branch. The home block is the basic block in which the speculative operation originally resides in the program. The previous basic blocks for a given basic block include all the basic blocks that can branch to the given basic block or that sequentially precede the basic block.

An operation moved in this manner is referred to as "speculative" or "anticipatory" because it is executed before it is known whether the operation will be used in the program. The result of a speculative operation may never be used because a conditional branch that leads to the home block of the operation may take a different path.

While speculative code motion can improve the performance of VLIW and superscalar processors, a problem can arise when a speculative operation generates a fault. Consider, for example the following source code:

if(A!=0) B=*A

A non-speculative version of this code would be:
. . . (some code here)
branch to instruction X if register A holds a 0
load register B from the address in register A
X: . . .

The speculative version of this code would be:
load register C speculatively from the address in register A
. . . (some code here)
branch to instruction X if register A holds a 0
copy the contents of register C to register B
X: . . .

In this example, the speculative code motion improves the instruction level parallelism, and has the additional benefit of reducing the impact of the latency incurred in the load operation. However, a speculative operation may generate a fault even if the result of the operation is never used in the program. For instance in this example, the speculative load operation may generate a fault when register A holds a zero. If a speculative operation generates a fault, it should not be reported or processed immediately. Instead, processing of the fault should be deferred until it is known that the result of the operation will actually be used in the program. This point is sometimes referred to as the commit point, the point where we know that the result of the operation will be needed.

There are a number of possible approaches to deal with exceptions generated during speculative execution. One conservative approach is referred to as "safe speculation." In this approach, only operations that do not generate exceptions are moved speculatively. This approach does not improve instruction level parallelism sufficiently because it precludes speculative motion of many operations. Moreover, it does not allow load operations to be executed speculatively, and therefore, does not have the benefit of hiding memory latency.

Another alternative approach is referred to as boosting. In this approach, a speculative operation is tagged with the path back to its home basic block. To defer an exception, this state information must be saved until the processor takes a different execution path or it uses the result of the operation in a non-speculative operation.

The need to save this state information is a drawback of the boosting technique. Additional memory is required to store this state information. This gives rise to a trade off between the extent to which boosting can be achieved and the additional memory required to store the state information. The number of branches that an operation can be moved across is limited by the memory available to store the state information.

Another approach involves the use of a poison bit to defer exceptions. In this approach, the processor marks the result register of a speculative operation with a poison bit when an exception has been generated. When another speculative operation uses the result of this operation, the processor propagates the exception by setting a poison bit in the result register of the operation. Processing of the exception is deferred until a non-speculative operation consumes the poison bit. At that point, the processor reports or processes the exception.

Yet another approach is referred to as tagging. In this approach, each operation has a tag associated with it. Typically, a tag of zero indicates that the operation is non-speculative. For speculative operations, the tag refers to memory in the processor such as a tag table that stores information about deferred exceptions. In this scheme, a commit operation is inserted at the home block of an operation to check for a deferred exception.

While these approaches of deferring exceptions improve ILP by increasing the number of operations that can be executed speculatively, the processor needs a method for processing deferred exceptions when they are detected. The process of handling a deferred exception includes re-executing one or more of the speculative operations in a non-speculative manner. This process is generally referred to as "recovery," while the process of re-executing operations in the recovery mode is referred to as "re-execution."

One way of performing recovery is to branch to block of fix-up code when a deferred exception is detected. Fix-up code is a block of code added to the program by the compiler to handle an exception from a speculative operation. In this approach, the compiler is responsible for adding a block of fix-up code for every chain of speculative operations in the program. The fix-up code includes each of the operations in the speculative chain, but they are in non-speculative form so that any exceptions generated while the processor recovers from the exception are handled immediately. When the processor detects an exception, it branches to the fix-up code, executes the fix-up code, and then resumes processing at the point where it detected the exception.

If a program is scheduled with several speculative operations or chains of operations, then a great deal of fix-up code has to be generated. As a result, the fix-up code can cause the size of the program to balloon. The need to generate fix-up code also complicates the compiler design. It is possible to have several operations interspersed within a sequence of code that should not be re-executed. For example, if an operation is not dependent on a speculative operation or any consumer of the results of the speculative operation, it should not be re-executed in the event that the speculative operation generates an exception. Because of operations like this, the compiler has to ensure that the fix-up code only includes the operations necessary to recover from the exception. As such, the compiler design is complicated by the need to compute the fix-up code for each speculative chain, whether or not the results of the speculative chain are actually used by non-speculative operations during execution of the program.

SUMMARY OF THE INVENTION

The invention provides a method and processor control logic for performing in-line recovery from exceptions generated by speculative operations in a processor. The invention is particularly suited for processors that can execute operations speculatively and defer processing of an exception until a non-speculative operation uses the result of a speculative operation that has either generated or propagated the exception.

The method for in-line recovery uses a re-execution register to indicate which operations should be re-executed in a special recovery mode of the processor. The entries in the re-execution register are associated with registers in the processor's register file. The processor uses these entries to determine whether to re-execute an operation while in recovery mode. Specifically, these entries mark the operands of operations, and the processor determines whether to re-execute an operation based on whether one or more of the source operands for the operation are marked. The processor dynamically marks operands when it detects a deferred exception, and when it re-executes operations in recovery mode.

If the processor detects a deferred exception, it branches to the speculative operation that generated the exception and enters an in-line fix up mode. It remains in this mode, selectively re-executing operations of the program, until it returns to the point where it detected the exception.

In one implementation of the method, the processor enters an in-line fix-up mode when it checks a speculative operation and determines that it has generated or propagated an exception. The processor checks for deferred exceptions by executing a check operation typically located at the home basic block of a speculative operation or speculative chain of operations. If the processor detects a deferred exception for an operation, it marks the re-execution register entry or entries associated with the target register(s) of this operation. The processor then branches to the speculative operation that generated the exception and enters a fix-up mode.

In this implementation, the processor keeps track of the program counter value of the check operation so that it knows when it has returned to this point in the program. While in fix-up mode, the processor executes the first operation. It then executes subsequent operations if at least one of their source operands are marked in a corresponding entry in the re-execution register. If the processor re-executes an operation, it sets the re-execution register entry or entries associated with the target register(s) of the re-executed operation. Thus, any consumer of the results of a re-executed operation is re-executed while in fix-up mode. While in recovery mode, the processor executes operations non-speculatively, meaning any exceptions are reported and/or handled immediately. The processor exits this in-line recovery mode when the instruction pointer returns to the program counter value of the check operation.

There are a number of ways to incorporate hardware support for this in-line recovery approach in the processor. In one implementation, the processor includes a re-execution register with entries associated with registers in the register file, a check operation unit for detecting deferred exceptions and initiating recovery mode, and in-line recovery mode control logic which tells the processor to selectively re-execute operations by evaluating and updating entries in the re-execution register. The processor can also include an additional register for storing the program counter value at the entry point to the recovery mode. The processor can then use this register to determine when to exit recovery mode.

When designed according to the approach summarized here, a processor can support speculative execution without the need for fix-up code. Instead, the processor uses the program code itself to recover from exceptions generated by speculative operations. In addition to eliminating the need for fix-up code, this type of processor also simplifies the compiler design because the compiler does not have to determine which operations to place in blocks of fix-up code.

Further advantages and features will become apparent with reference to the following detailed description and accompanying drawings.

DETAILED DESCRIPTION

Figure 1:
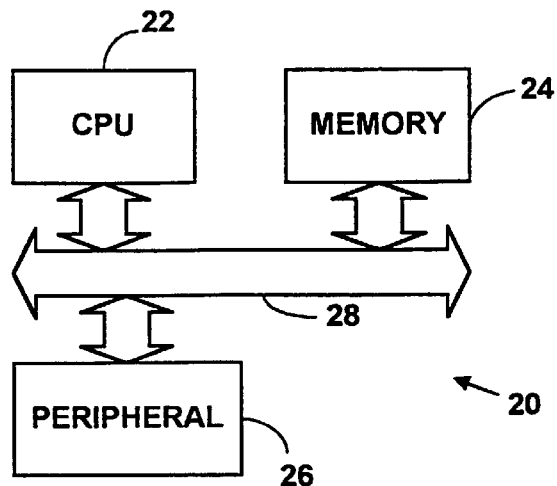
FIG. 1 is an overview diagram of computer system in which the invention can be implemented.

As an overview, FIG. 1 illustrates a generalized block diagram of a computer system 20 in which the invention can be implemented. The computer system 20 includes a CPU 22 coupled to memory 24 and one or more peripheral devices 26 via a system bus 28. The system bus 28 carries data and control signals to the CPU 22, memory 24 and peripheral devices 26. The memory 24 preferably includes Random Access Memory (RAM), but may also be implemented with Read Only Memory (ROM), or a combination of RAM and ROM. The memory 24 stores data for one or more programs that are executed in the computer system 20.

Figure 2:
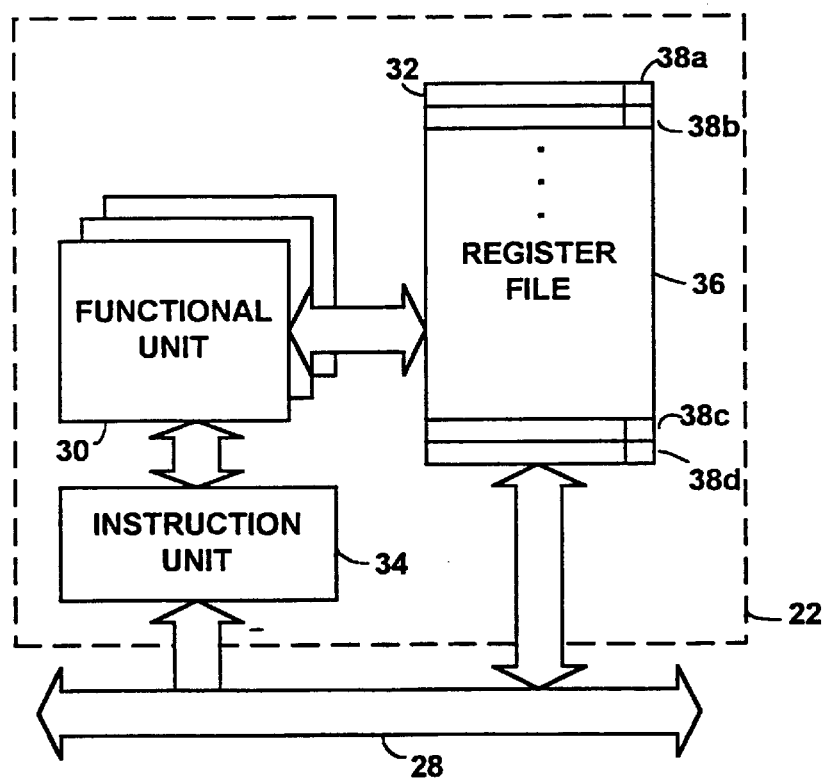
FIG. 2 is a general block diagram of a processor in which the invention can be implemented.

FIG. 2 is a general block diagram of a processor 22 in an implementation of the invention. The processor 22 includes multiple functional units 30, one or more register files 32, and an instruction unit 34. The register files 32 typically contain several general purpose registers 36 for storing values, addresses and possibly other data. The term "general purpose registers" can include floating point, fixed point, and predicate registers, to name a few.

The architecture of the processor 22 may vary. This particular architecture merely depicts the high level hardware design of a processor 22 in one possible implementation. Speculative execution implemented according to the invention can provide performance improvement in a variety of CPU designs, including in particular, CPUs with multiple functional units or CPUs with multiple pipelined functional units. Speculative execution is particularly effective in enhancing performance in Very Long Instruction Word (VLIW) computers.

In the process of running a program, the CPU 22 carries out a series of instructions stored in memory 24. The instruction unit 34 fetches an instruction from memory via the system bus 28 and then decodes the instruction. Depending on the type of CPU and/or the scheduling method used, an instruction may have more than one operation. The instruction unit 34 issues operations to a functional unit 30 or to multiple functional units (shown as stacked boxes in FIG. 2). The instruction unit 34 sends control signals to a functional unit 30 to carry out the operation or operations in an instruction. In response to these control signals, the functional unit 30 reads data such as address or value from the appropriate registers in the register file 32 and performs an operation. For some operations, the functional unit 30 writes a result back to the register file 32. For a memory store operation, the functional unit 30 reads a memory address and a value stored in the register file 32 and transfers the value directly to memory 24.

Figure 3:
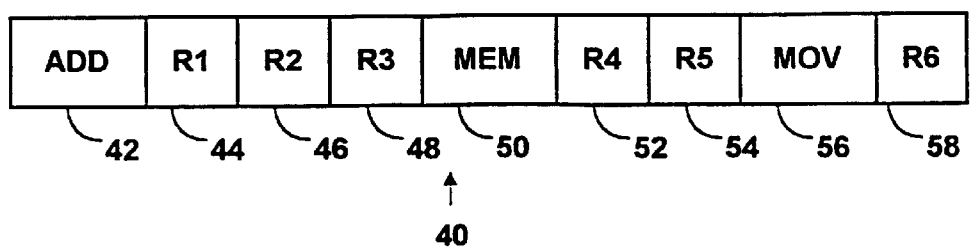
FIG. 3 is an example of an instruction that includes multiple operations.

FIG. 3 illustrates the format of an instruction 40 having multiple operations. The instruction includes three operations, each including an opcode and one or more operands. Starting from the left, the first operation in the instruction includes an opcode 42, a destination register field 44, and two source register fields 46, 48. The second operation has an opcode 50 and two source register fields 52, 54. Finally, the third operation has an opcode 56 and only a single source register field 58. The source register fields specify the location of the inputs to the operation, and the destination ("target") register field specifies the location of the result.

These three operations provide an example of a typical instruction. The first operation is a arithmetic ADD operation in which the functional unit 30 reads values stored in registers R1 and R2, adds them, and writes the result to register R3. The second example operation is a memory operation 50 in which the first register R4 stores an address and the second register R5 stores a value. The functional unit 30 reads the address and value from the registers and stores the value in memory 24 at the specified address. The third example operation is a simple move (MOV) operation. To support speculative execution, the hardware semantics of this operation may be modified so that the operation may be used to check for deferred exceptions.

For example, the functional unit 30 reads the source register R6 and if an exception has occurred, initiates a branch operation to an error handling routine or a recovery mode. The source register for the check operation is the same as the register to be checked for a deferred exception. The source register of the check operation may be the destination register of a speculative operation that has generated and deferred an exception, or of a speculative operation that has propagated the deferred exception. In either case, the source register that is checked contains information about the deferred exception.

In order to defer exception processing for speculative operations, the processor must be able to distinguish between speculative and non-speculative operations. There are a variety of different ways to accomplish this. One way is to encode speculative and non-speculative versions of operations in the instruction set architecture. In this particular approach, the opcodes identify whether an operation is non-speculative or speculative. For example, the opcode 42 of the ADD operation in FIG. 3 could be encoded to designate the operation as either speculative or non-speculative. The version of the operations affects whether an exception generated by the operation will be reported immediately or deferred. If a non-speculative operation generates an error, the functional unit 30 reports the error immediately. If a speculative instruction generates an exception, on the other hand, the functional unit 30 will defer reporting the exception. In the latter case, the exception will only be reported if the result of the operation is actually used in its home basic block.

Another approach is to treat operations as natively speculative or non-speculative. In contrast to the first approach, this second approach supports speculative execution without including opcodes for speculative operations. Instead, the processor treats a number of predetermined operations in the instruction set as speculative without requiring that these operations be specially encoded. Like the first approach, this approach also includes architectural support for deferring exceptions from speculative operations and for reporting these deferred exceptions.

One way to implement this second approach is to have the scheduler and processor treat a predetermined set of operations in the instruction set as speculative. This set of operations may potentially include any operation in the instruction set. However, operations whose effects are difficult to undo such as branch operations or operations visible outside the CPU should generally not be executed speculatively. All of the operations that are not visible outside the CPU may be treated as natively speculative operations by changing the hardware semantics in the functional unit 30 such that it defers exceptions for speculative operations. Natively speculative operations are scheduled as speculative operations, and the CPU hardware includes support for deferring and reporting deferred exceptions from these operations. While a predetermined set of a operations are treated as natively speculative in the CPU, operations visible outside the CPU remain non-speculative. An example of an operation visible outside the CPU is a memory store. It is considered to be visible outside the CPU because it interacts with memory outside the CPU, and more specifically, involves overwriting a location in memory 24. It is not preferable to execute such an operation speculatively because it may affect another process interacting with the same memory location. It is also more difficult to correct an error generated by an operation that affects the state of external hardware. For these reasons, it is preferable to treat operations visible outside the processor as non-speculative.

Using this second approach, the instruction set of the processor does not require speculative and non-speculative versions of operations. As a result, speculative execution can be supported in a manner that maintains compatibility with an existing instruction set architecture. The operations that are treated as natively speculative and non-speculative vary with the architecture of the CPU. In some systems, all operations except those visible outside the CPU can be treated speculatively.

Since the instruction set of the processor does not have to be modified to specially encode speculative operations in the second approach, executable code is compatible with the processor, whether or not it has been optimized using speculative code motion. To take advantage of the speculative execution supported in the CPU, programs are optimized using speculative code motion to move operations for which the CPU has a speculative version. Two categories of programs may therefore exist: existing programs that have not been optimized using speculative code motion, and new programs that have been specifically optimized for the speculative execution supported by the CPU. To maintain compatibility with both programs, the CPU may include circuitry to support a non-speculative mode and a natively speculative mode.

If the CPU is to support both modes of operation, it must include circuitry for recognizing whether a program has been optimized for speculative execution. This circuitry may include a register such as the status word register where a mode bit may be stored. Before the CPU begins execution of a program, it reads this register and switches to the appropriate mode. The mode bit may be set in a variety of ways. For example, if a program has been compiled to take advantage of speculative execution supported in the CPU, then the operating system may be programmed to set the mode bit. Alternatively, the compiler of the program may set the mode bit by identifying the mode in a status operation placed in the binary form of the program. Many other ways of specifying the mode of operation are possible and will be apparent to those of skill in the art.

A processor that supports speculative execution includes architectural support for deferring and reporting exceptions. This can include a tag field (for example, 38a–d) in the registers of the register files 32. When an exception occurs in a speculative operation, the functional unit sets an error tag code in the tag field to indicate that an exception has occurred. This exception is not reported immediately, but rather, is deferred. Information about the exception is sometimes written to the destination register to assist in error handling. This information can identify the instruction, and the operation within the instruction, which generated the exception. For example, the information may uniquely identify the program counter value of the operation that generated an exception. It may also identify the type of exception such as an address violation, arithmetic underflow and overflow, etc.

If another speculative operation uses the result of this operation as an input, then the exception is propagated. To propagate the exception, an error tag code such as a tag bit in the tag field 38a–d is set in the destination register, and the exception information is copied into the destination register. Any subsequent speculative operation for which this register is a source will propagate the exception by copying the tag field of the source register to its result register. In this manner, the processor defers exceptions generated by speculative operations until the result of the operation is actually used in the execution path of the program.

The tag field 38 indicates whether the data field is to be interpreted as correct data or as status. The status information describes either the nature of an error (error status) or it indicates how an operand resulting from a deferred exception may be correctly regenerated through exception processing (exception recovery status). An "error" in this context means a non-recoverable exception.

In order to support error reporting, the tag field (and possible error status) is propagated forward, by hardware, to a non-speculative operation which no longer propagates the error. If a speculative operation is executed and one or more input operands are tagged with error, its result operands are also tagged with error. When an operation is tagged as erroneous, it optionally carries an error status field indicating the nature of the error. The error status is propagated much like the tag.

In order to support deferred exception handling, the tag field (and possible exception recovery status) is propagated forward to a non-deferring use of the value which no longer propagates the deferred exception. Deferred exception propagation proceeds much like error propagation. If only one input is tagged with a recovery status its value is propagated as the operation result. If multiple operation inputs are tagged with a recovery status, any of the inputs may be selected as the result.

Error propagation takes precedence over propagation of deferred exceptions. Thus, if one input is tagged with error status, while another input is tagged with recovery status, error status is propagated.

Any information which is available at the time an exception is deferred and used at the time the exception is processed is encoded in the recovery status field. There are a number of types of information which may be put in the recovery status field depending on the exception recovery strategy. One example is the program counter of the instruction which originated the deferred exception. This supports an in-line recovery scheme which require knowledge of the operation that generated the exception. For example, one implementation of an in-line recovery scheme described below uses the program counter value of the exception-generating operation to branch back to the operation where the exception originated.

Another example is an exception recovery status which encodes the operation needing re-execution to process a deferred exception. The status field can encode the original trapping instruction e.g. the instructions rx=floating_add (ry,rz) or rx=memory_load(ry) could be encoded in the recovery status.

Having described the processor in general, we now describe a specific implementation of a processor with support for in-line recovery in more detail.

Figure 4:
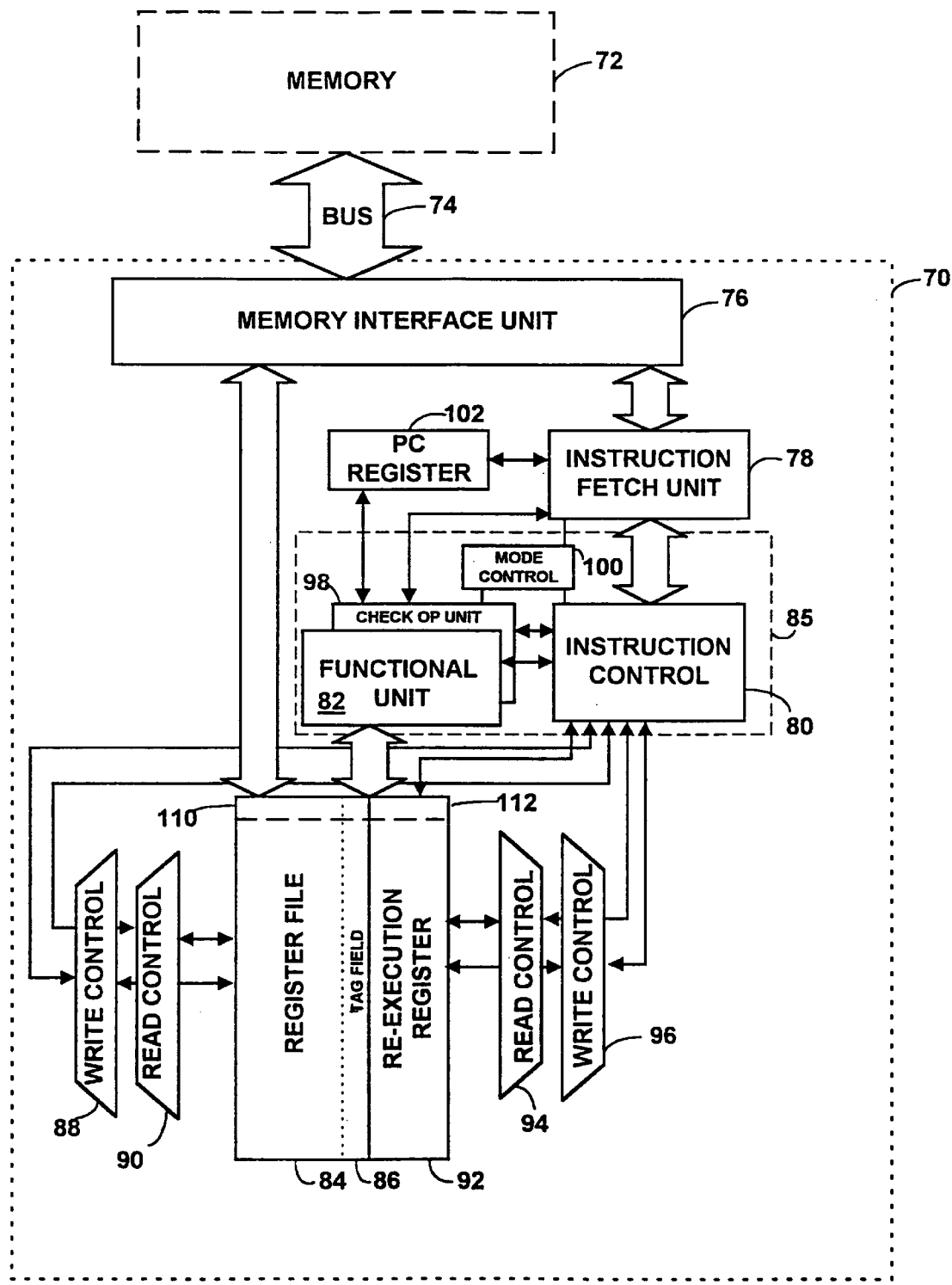
FIG. 4 is a block diagram illustrating a processor including a re-execution register.

FIG. 4 is a block diagram illustrating a processor including control logic for performing in-line recovery from exceptions generated by speculative operations. The processor 70 shown in FIG. 4 interfaces with main memory 72 of the computer through the local bus 74. The processor includes a memory interface unit 76, an instruction fetch unit 78, an instruction control unit 80, and functional unit 82. Together, the functional unit and instruction control unit form the re-execution control 85 in this implementation. We have enclosed the instruction control unit 80 and functional unit 84 and refer to it as "re-execution control" because some functions used to support in-line recovery can be implemented in either unit. Before describing in-line recovery in more detail, we begin by describing the primary elements of the processor 70 in FIG. 4.

The memory interface unit 76 serves as an interface between the processor 70 and the local bus 74 to the computer's main memory. It controls the transfer of instructions and data to and from memory 72. The specific design of the memory interface unit 76 is not critical to the invention, and its design can vary. It can include a cache for temporarily storing instructions and data, or separate caches for instructions and data as in the Pentium processor from Intel Corp.

The processor 70 has five primary stages for processing instructions 1) fetch the next instruction; 2) decode the instruction; 3) read source registers; 4) execute operations; 5) and write target registers. The instruction fetch unit 76 fetches instructions from the memory interface unit 76. For instance, if the memory interface unit implements a code cache, the instruction fetch unit fetches the next instruction from the code cache. The instruction fetch unit maintains an instruction pointer, which specifies the location of current instruction issued to the processor.

The instruction control unit 80 decodes the instruction to determine which operation or operations are in the instruction, as well as the source and target registers of the operation(s). As explained above, an instruction in a VLIW processor typically has more than one operation in each instruction. The instruction control unit 80 controls how these operations are issued to the functional units in the processor for execution. To simplify this description, FIG. 4 illustrates a single functional unit 82 and a corresponding register file 84. The actual implementation of this type of VLIW processor includes more than one functional unit and register files corresponding to the functional units.

The instruction control unit 80 decodes the operations in an instruction and issues the operations to the appropriate functional unit (such as functional unit 82 in FIG. 4). It also decodes the source and target registers in the register file so that the functional unit can read the correct source register, and then write the result to the correct target register.

The instruction control unit 80 controls read and write operations to the register file through read and write control logic 88, 90. The read control logic 90 decodes the source register or register for the operation so that the functional unit reads the correct registers for the current operation. Similarly, the write control logic 88 decodes the target register or registers so that the functional unit writes results to the correct registers for the current operation.

The functional unit 82 executes operations issued to it by the instruction control unit 80. It reads data from the source register or registers, executes the operation and writes (or controls the writing of) the results to the target registers. The functional unit can execute speculative and non-speculative operations. As introduced above, the functional unit defers exceptions generated for speculative operations, and immediately handles exceptions for non-speculative operations.

This particular implementation defers exceptions by setting a tag field 86 associated with the result register or registers of the speculative operation in the register file 84. The functional unit propagates exceptions by setting a poison bit in the tag field of the target register for subsequent speculative operations that use or propagate the exception as explained above. FIG. 4 illustrates the tag field 86 as part of the register file. In this particular implementation, the tag field is outside the data field of its corresponding register in the register file 84. However, this is not a requirement. The functional unit 82 propagates the program counter value of a speculative operation that has generated an exception by writing it to the target register of the operation and the target register of any speculative operation that uses the result of the speculative operation. Note that it is possible to propagate the program counter value to several registers by propagating the exception through speculative operations.

Having generally described the elements of the processor in FIG. 4, we now describe the control logic for performing in-line recovery in more detail. The processor in FIG. 4 includes a number of elements that support in-line recovery from exceptions generated by speculative operations. These elements include: 1) a re-execution register file 92; 2) read and write control logic 94, 96 for controlling reading from and writing to the re-execution register; 3)a check operation (op) unit 98; 4) mode control logic 100 for switching the processor to and from a fix-up mode; and 5) a program counter (PC) register 102 for storing the program counter value of a check operation that has detected a deferred exception. These elements can be implemented in a variety of ways, and the specific implementation shown in FIG. 4 is only one possible alternative. In addition to this specific hardware support for in-line recovery, the primary elements of the processor, including the instruction fetch unit 78, instruction control unit 80, and the functional unit(s)82, are also adapted to support the in-line recovery mode. In fact, the functional unit 82 includes the check op unit 98 and mode control logic 100 in this implementation, though this is not a requirement.

The re-execution register 86 includes entries corresponding to registers in the register file 84. Each of the registers with tag fields have corresponding entries in the re-execution register. To illustrate this, FIG. 4 shows the re-execution register adjacent to the register file 84. For example, register 110 has a corresponding entry 112 in the re-execution register. The re-execution register 92 stores re-execution flags to mark corresponding registers in the register file for re-execution. If a source register of an operation is marked, the functional unit 82 will re-execute the operation while in recovery mode. The specific operation of the re-execution register is detailed further below.

The read and write control logic 94, 96 is used to control read and write operations to the re-execution register. In this implementation, the read and write control logic operates in conjunction with the instruction control unit 80 to read and write re-execution flags during in-line recovery. The write control logic 96 is also used to set the re-execution flag for a corresponding register in the register file when the check operation unit 98 detects an exception at that register.

In this implementation, the check operation unit 98 is implemented as one of the functional units 82. It is responsible for performing a check operation to check for a deferred exception. The check operation can be either an explicit check operation inserted in the home basic block by the compiler of programmer, or can be an implicit check operation. An implicit check operation is a non-speculative operation, which includes additional semantics for checking for a deferred exception. An implicit operation can by any type of non-speculative operation in the home basic block of a speculative operation. When an implicit check operation is executed, it performs its ordinary function, and in addition, checks for a deferred exception. In this implementation, the implicit check operation checks one or more result registers of speculative operations in a speculative chain to see if an exception has been deferred.

The check operation unit 98 in this implementation not only checks for a deferred exception, but it also plays a specific role in recovery. If it detects a deferred exception, the check operation unit controls the writing of the re-execution flag in the re-execution register entry that corresponds to the register where the exception is detected. For example, if the check operation detects a deferred exception in the tag field of register R7, it sets the corresponding entry in the re-execution register file. This ensures that the processor will re-execute the speculative operation that has either generated or propagated the detected exception.

The check operation unit 98 is also responsible for initiating the in-line recovery mode. To accomplish this, it switches the processor into the in-line recovery mode and causes the processor to branch to the speculative operation that generated the exception. In this implementation, the program counter value of the speculative operation is propagated to the register where the exception is detected. The check operation unit 98 transfers this program counter value to the instruction fetch unit 78. The instruction fetch unit 78 reads this program counter value when placed in recovery mode and branches to the operation identified by this program counter value by setting the instruction pointer to this value.

An alternative to this approach is to store the program counter value in a buffer register in the processor, rather than propagate it through registers in the register file, and then signal the instruction fetch unit 78 with this value if an exception associated with this operation is detected.

The processor has mode control logic 100, to specify the recovery mode of the processor. The mode control logic 100 specifies whether or not the processor is in fix-up mode. When the check operation initiates fix-up mode, it sets a mode control bit indicating that the processor has entered fix-up mode. When in fix-up mode, the mode control logic 100 instructs the processor to: 1) execute all operations non-speculatively, meaning that exceptions are handled immediately; 2) execute the first operation in recovery mode, whether or not the appropriate re-execution flags are set (this is the operation to which the instruction fetch unit 78 branches in recovery mode); and 3)execute subsequent operations if one or more of the re-execution flags are set for the source operands of the operations.

Figure 5:
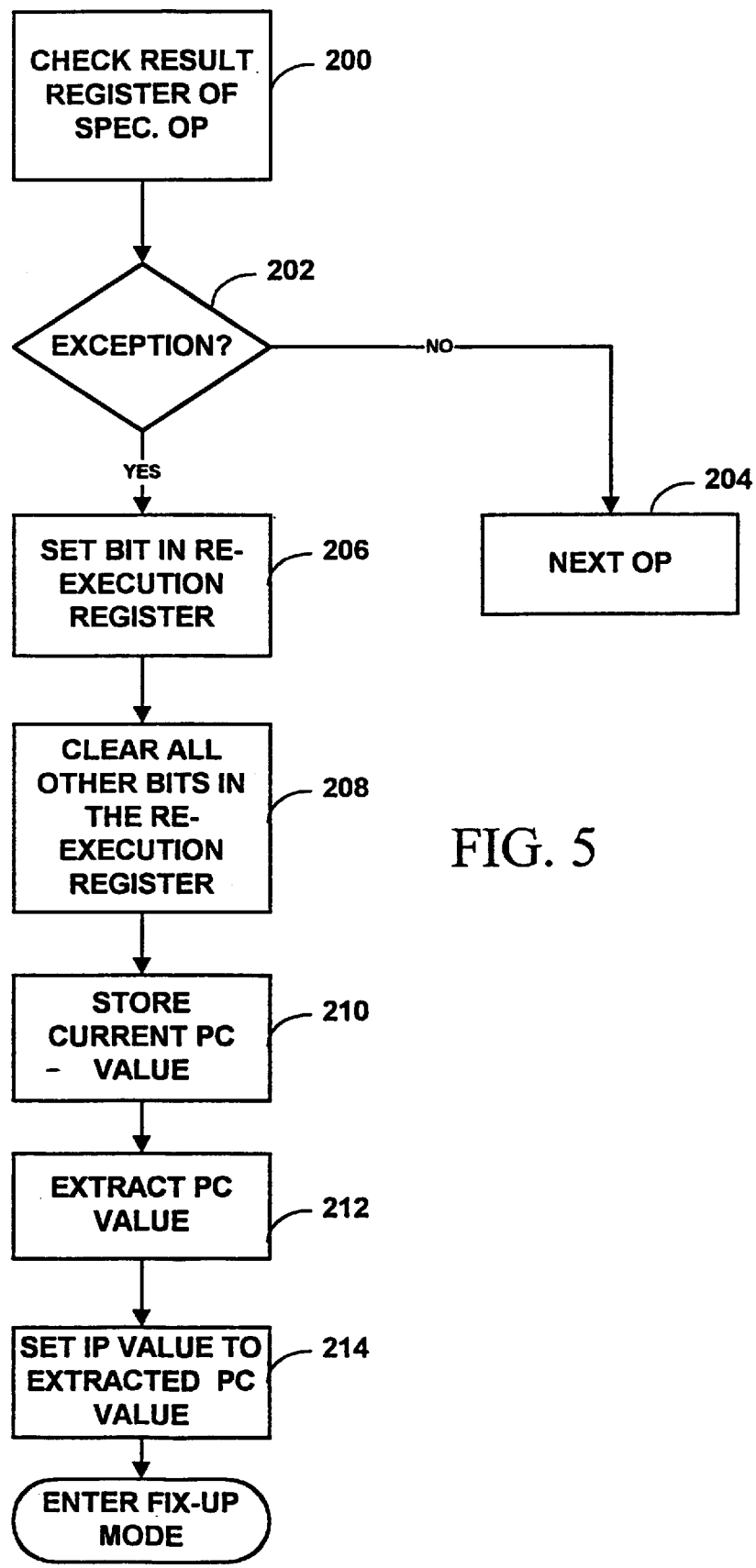
FIG. 5 is a flow diagram illustrating how the processor in FIG. 4 processes a check operation.

FIG. 5 is a flow diagram illustrating how fix-up mode is initiated during a check operation in the processor of FIG. 4. The method shown in FIG. 5 begins at the point where the check operation checks the result register of a speculative operation for a deferred exception (see step 200). When the instruction fetch unit 78 issues an instruction with a check operation, the instruction control unit 80 decodes the check operation and identifies the register in the register file to be checked for a deferred exception. A typical check operation might look like: Chk R7, where chk represents the op code of the check operation and R7 is the register to be checked. As noted above, the check operation may also be implicit in a non-speculative operation such as: load R7 with data at memory address in R6, in which the functional unit checks the error tag field associated with R6 before performing the load operation. In either case, the register being checked is the result register of a speculative operation that may have generated or propagated an exception.

When the functional unit 82 executes the check op, the check op unit 98 evaluates the tag field of the source register of the operation to check whether an exception has been deferred. As illustrated by the decision step 202 of FIG. 5, if no exception is detected, the processor proceeds to the next operation as shown in step 204.

If an exception is detected, the check op unit 98 proceeds to set a re-execution flag in the re-execution register entry associated with the result register of the speculative operation being checked (see step 206). The check op unit 98 also clears all other entries in the re-execution register as shown in step 208. The check op unit 98 operates in conjunction with the instruction control unit 80 to clear the entries in the re-execution register and set the entry corresponding to the source register of the check op when an exception is detected. When the instruction control unit 80 decodes the source register of the check op, it also locates the corresponding re-execution register entry. When it detects an exception, the check op unit 98 signals the instruction control unit 80 to clear the re-execution register. The check op then writes a re-execution flag to the corresponding re-execution register entry.

The check op unit 98 stores the current PC value in this implementation as shown in step 210. To accomplish this, it signals to the mode control logic 100 that the processor should enter fix-up mode. The mode control logic instructs the instruction fetch unit 78 to save the current PC value in the PC register 102. The check operation unit then initiates the branch to the speculative operation that generated the exception. To accomplish this, it extracts the PC value from the source register of the check op as shown in step 212, and transfers it the instruction fetch unit 78. This sets the instruction pointer (IP) to the PC value of the speculative operation that generated the exception as shown in step 214. Once the IP is set to the PC value, the processor is ready to enter fix-up mode.

Figure 6:
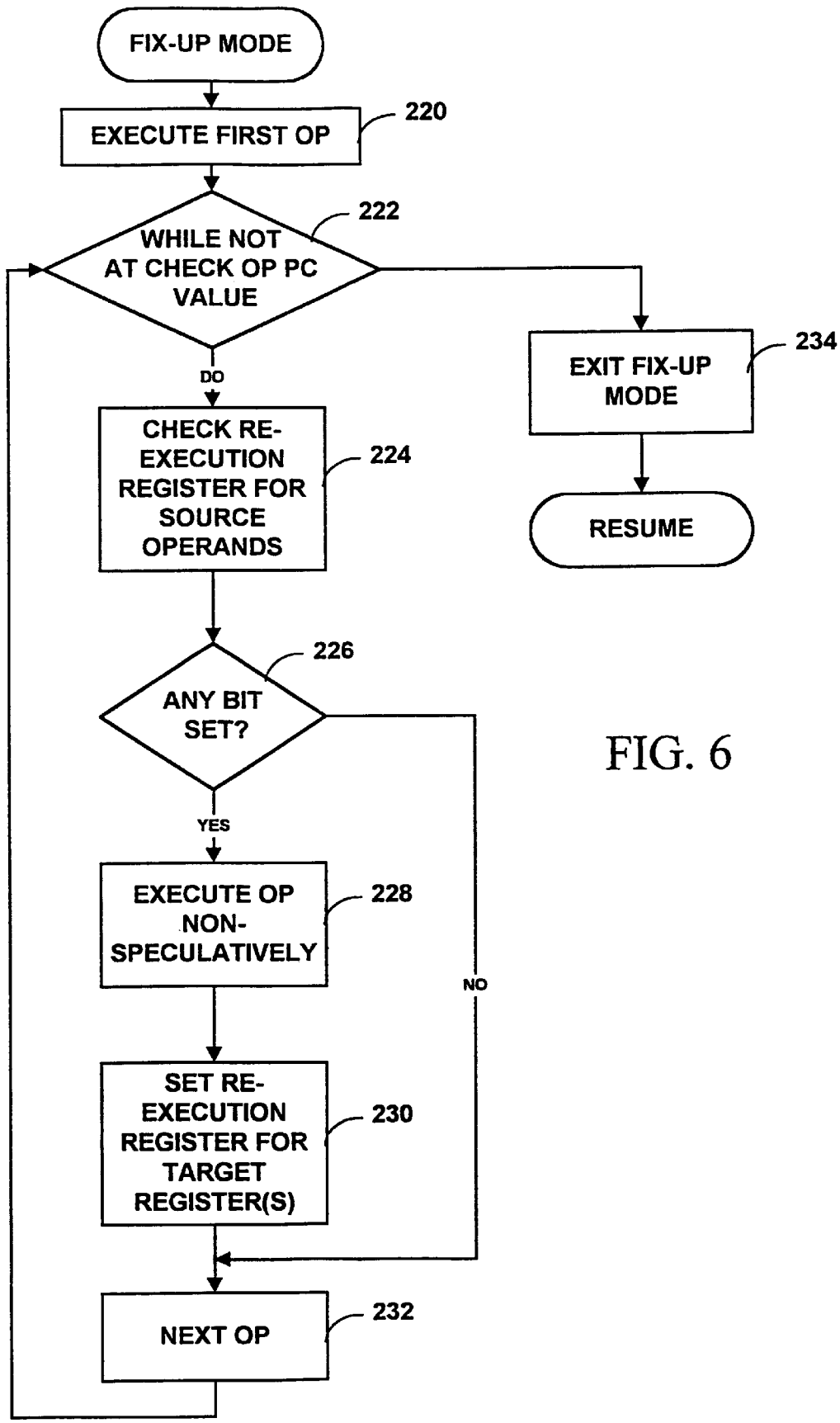
FIG. 6 is a flow diagram illustrating the operation of the processor in FIG. 4 during an in-line recovery mode.

FIG. 6 is a flow diagram illustrating the operation of fix-up mode in this implementation. In fix-up mode, the processor executes all operations non-speculatively. The processor selectively re-executes operations according to the following approach.

The processor begins fix-up mode by executing the first operation (see step 220), whether or not the re-execution flag in the corresponding re-execution register entries are set. This first operation is the speculative operation that generated the exception and whose PC value was propagated to the register checked by the check op unit. When the instruction control unit decodes the operation, it also decodes the re-execution register entry or entries corresponding to the result register or registers of the operation. Then, when the functional unit executes the operation, it not only writes the result to the result registers, but it also sets the re-execution flag in the re-execution register entry or entries corresponding to these result registers.

After this first operation, the processor proceeds to selectively re-execute operations based on whether a re-execution flag is set in the re-execution register entry or entries corresponding to the source registers of the current operation. As shown by decision block 222 in FIG. 6, the processor remains in fix-up mode until the IP reaches the PC value of the check operation. In this implementation, the instruction fetch unit 78 determines whether it has reached the check op PC value by comparing the IP with the PC value stored in the PC register. An alternative approach for determining when to exit recovery is to detect when the original check op. For instance, the instruction unit 80 can be adapted to turn off the recovery mode and resume normal execution when it decodes the check operation that triggered the recovery mode.

This alternative approach can be disadvantageous because it potentially precludes certain nestings of speculation chain/ check operation pairs. The speculative chains and associated check ops may be nested such that the processor cannot tell whether a given check operation is the one that initiated a current mode of in-line recovery.

While in fix-up mode, the re-execution control 85 in the processor evaluates the re-execution register entries for the source registers of a current operation to determine whether to re-execute the operation (see step 224). Preferably, the instruction control unit 80 checks these entries during the decode stage using read control logic 94 to identify the entry or entries corresponding to the source operands. This enables the instruction control unit 80 to determine whether to issue the operation to the functional unit 82. If the current operation does not need to be re-executed, the instruction unit halts processing of the current operation and moves immediately to the next operation as shown in FIG. 6. The instruction control unit 80 skips the current operation if none of the re-execution register entries corresponding to the source operands are set.

If any re-execution flags are set in the corresponding re-execution register entries (decision step 226), the instruction control unit 80 instructs the functional unit to execute the operation. The execution units within the functional unit write a re-execution flag to the re-execution register entries corresponding to the result registers of the operation being executed. During the decode phase, the instruction control unit 80 decodes the source and target registers of the operation and also the source and target re-execution register entries. The write control logic 96 for the re-execution register ensures that the execution unit writes to the proper entries.

A number of variations on the above implementation are possible. For example, instead of using the instruction control unit 80 to read the re-execution flags, the functional unit 82 can read the appropriate re-execution register entries once they are decoded by the instruction control unit 80. The functional unit 82 would then halt execution of an operation if none of the re-execution flags for these entries were set.

As another variation, the instruction control unit 80 can be adapted to control the decoding, reading of flags, and writing of flags to the re-execution register. If after determining that at least one re-execution flag is set for a source operand, the instruction control unit 80 could then issue the operation to the functional unit for execution and write the re-execution flags to the entries corresponding to the target registers of the operation. As is apparent from this discussion, a number of variations are possible and either the functional unit 82 or instruction control unit 80 can be adapted to read and write re-execution flags. Therefore, we generally refer to the instruction control 80 and functional units 82 as the re-execution control 85 so that the invention is not limited to one of the specific implementations described here.

As introduced above, the processor exits fix-up mode when the IP returns to the PC value of the check operation. At this point, the instruction fetch unit 78 turns off the fix-up mode bit in the mode control logic 100 and the processor resumes normal operation as shown at steps 222 and 234 in FIG. 6.

As illustrated by this detailed description, the processor does not require the compiler to generate fix-up code, but instead, uses the program itself as the fix-up code. The processor selectively re-executes portions of the program by keeping track of the speculative operation that generated an exception and then using a re-execution register to mark the operands of subsequent operations. The processor sets re-execution flags in the re-execution register dynamically during in-line recovery mode. As such, the compiler does not have to compute which operations need to be re-executed in the event that a speculative operation generates an exception.

While we have described our invention with reference to specific embodiments, we do not intend to limit the scope of our invention to these embodiments. For example, it is not necessary to propagate an error tag or a program counter value as described as long as the check operation specifically checks the operation that has generated an exception. If the check operation unit checks the exception generating operation, it can branch to this operation and enter recovery mode as explained above. Note that there is no requirement to propagate a poison bit or PC value because the check op unit 98 is specifically checking the operation that generated the execution, not some consumer of the operation's results. To accommodate this approach, the compiler inserts check operations such that each speculative operation that can generated a recoverable exception is checked. This can be implemented by using a check op unit 98 that checks more than one operation, or using several check ops, each responsible for checking a speculative op.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

We claim:

1. A method for in-line recovery from an exception generated by a speculative operation in a processor, the method comprising:

in response to detecting that a first speculative operation has generated an exception, branching to the first speculative operation and entering an in-line fix-up mode;

while in the in-line fix-up mode:
  a) non-speculatively re-executing the first speculative operation;
  b) evaluating a re-execution register entry corresponding to an operand of an operation to determine whether a flag in the corresponding re-execution register entry is set, and if so, re-executing the operation non-speculatively, and setting a re-execution flag in the re-execution register entry corresponding to a result register of the re-executed operation, if the re-execution flag is not set, then skipping to the next operation; and
  c) repeating step b to evaluate and re-execute subsequent operations using in-line recovery.

2. The method of claim 1 including:
in response to detecting that the first speculative operation has generated the exception, setting a re-execution flag in a first re-execution register entry corresponding to a result register of a second speculative operation; and
before entering an in-line fix-up mode, clearing entries in the re-execution register, except for the first re-execution register entry.

3. The method of claim 2 wherein the first and second speculative operations are the same operation.

4. The method of claim 1 further including:
when the first speculative operation generates the exception, marking a tag field associated with the result register of the first speculative operation; and
propagating the exception to a subsequent speculative operation setting a tag field associated with a result register of the subsequent speculative operation.

5. The method of claim 4 wherein the tag field is within the data field of the associated register.

6. The method of claim 4 wherein the tag field is outside the data field of the associated register.

7. The method of claim 1 further including:

when the first speculative operation generates the exception, marking a tag field associated with the result register of the first speculative operation; and detecting the exception by checking a tag field of the result register for the first speculative operation, or checking a tag field of a result register of another speculative operation that is dependent on a result of the first speculative operation.

8. The method of claim 1 further including:

when the first speculative operation generates the exception, marking a tag field associated with the result register of the first speculative operation and storing a program counter value for the first speculative operation;

when a subsequent speculative operation uses the result of the first speculative operation, copying the program counter value for the first speculative operation to the result register of the subsequent speculative operation, and setting the tag field associated with a result register of the subsequent speculative operation;

detecting the exception by checking the tag field of the result register for the subsequent speculative operation; and when the exception is detected, using the program counter value that has been propagated to the result register of the subsequent speculative operation to branch to the first speculative operation.

9. The method of claim 1 further including:

when the first speculative operation generates the exception, marking a tag field associated with the result register of the first speculative operation and storing a program counter value for the first speculative operation;

when a subsequent speculative operation uses the result of the first speculative operation, setting the tag field associated with a result register of the subsequent speculative operation;

detecting the exception by checking the tag field of the result register for the first or the subsequent speculative operation; and when the exception is detected, using the program counter value that has been stored to branch to the first speculative operation.

10. In a processor having a instruction fetch unit for fetching operations, a functional unit for performing the operations and a register file for storing operands of the operations, control logic for performing in-line recovery of speculative operations, the control logic comprising:

a re-execution register including entries corresponding to registers in the register file;

a check operation unit for determining whether a speculative operation has generated or propagated an exception, and for initiating an in-line recovery mode in the processor in response to detecting the exception;

a re-execution control unit in communication with the check operation unit for determining whether the processor is in-line recovery mode, the re-execution control unit in communication with the re-execution register for reading one or more re-execution register entries corresponding to a source or source registers of an in-line operation to be re-executed while in the in-line recovery mode, for controlling whether the in-line operation is re-executed based on a value or values in the one or more re-execution register entries, and for setting a re-execution flag in a re-execution register entry corresponding to a target register of a re-executed in-line operation.

11. The control logic of claim 10 wherein the check operation unit is in communication with the re-execution register for writing a re-execution flag in an entry of the re-execution register corresponding to a result register of the speculative operation in response to detecting that the speculative operation has generated or propagated the exception.

12. The control logic of claim 10 wherein the check operation unit is in communication with the register file for evaluating a tag field associated with a target register of the speculative operation in the register file to determine whether the speculative operation has generated or has propagated the exception.

13. The control logic of claim 10 wherein the check operation unit is in communication with the register file for reading a program counter value of a first speculative operation that has generated an exception from a data field of the target register, and wherein the instruction fetch unit is in communication with the check operation unit for determining the program counter value and for branching to the program counter value when the check operation unit detects the exception.

14. The control logic of claim 10 wherein the instruction fetch unit is in communication with the check operation unit for branching to the speculative operation that generated the exception when the check operation unit detects the exception.

15. The control logic of claim 10 wherein the instruction fetch unit is in communication with a program counter register for storing a current program counter value when the check operation unit detects the exception, and wherein the instruction fetch unit uses the program counter register to determine when to exit the in-line recovery mode.

16. The control logic of claim 10 wherein the functional unit of the processor includes the check operation unit, and wherein the functional unit is in communication with the re-execution register for writing re-execution flags to entries in the re-execution register.

17. The control logic of claim 10 wherein the re-execution control includes an instruction control unit for decoding source registers of the in-line operations and controlling reading of re-execution register entries corresponding to the source registers, and for decoding target registers of the in-line operations and controlling writing of re-execution flags to re-execution register entries corresponding to the target registers.

18. The control logic of claim 10 wherein the re-execution control includes an instruction control unit for decoding source registers of the in-line operations, for reading re-execution register entries corresponding to the source registers, and for skipping execution of an in-line operation in the in-line recovery mode.

19. The control logic of claim 10 wherein the re-execution control includes the functional unit of the processor, and wherein the functional unit is in communication with the re-execution register for reading entries in the re-execution register corresponding to source registers of an in-line operation in the in-line recovery mode, and for skipping or halting execution of the in-line operation when a re-execution flag is not detected in the re-execution register entries corresponding to the source registers.

20. A method for in-line recovery from an exception generated by a speculative operation in a processor, the method comprising:

executing a check operation to check the result register of a first speculative operation for a deferred exception;

in response to detecting that the first speculative operation has generated or propagated an exception, setting a re-execution flag in a first re-execution register entry corresponding to a result register of the first speculative operation;

before entering an in-line fix-up mode, clearing entries in the re-execution register, except for the first re-execution register entry;

determining a program counter value of a speculative operation that generated the exception;

storing a program counter value of the check operation;

branching to the program counter value of the exception generating operation and entering the in-line fix-up mode;

while in the in-line fix-up mode:

a) non-speculatively re-executing the exception generating speculative operation;

b) for subsequent operations in the in-line fix up mode, evaluating a re-execution register entry corresponding to an operand of an operation to determine whether a flag in the corresponding re-execution register entry is set, and if so, re-executing the operation non-speculatively, and setting a re-execution flag in the re-execution register entry corresponding to a result register of the re-executed operation, if the re-execution flag is not set, then skipping to the next operation; and c) determining when an instruction pointer returns to the program counter value of the check operation and exiting the in-line fix-up mode.

\* \* \* \* \*